United States Patent [19]

Nickols

[11] Patent Number: 4,784,395
[45] Date of Patent: Nov. 15, 1988

[54] FLUID SEAL WITH NOTCHED FLANGE AND METHOD FOR ITS MANUFACTURE

[75] Inventor: Steven L. Nickols, Frankfort, Ind.

[73] Assignee: Federal-Mogul Corporation, Southfield, Mich.

[21] Appl. No.: 754,046

[22] Filed: Jul. 11, 1985

[51] Int. Cl.⁴ .............................................. F16J 15/32
[52] U.S. Cl. ...................................... 277/153; 277/1; 72/379
[58] Field of Search .................. 277/1, 152, 153; 72/379; 29/DIG. 33; 264/294, 295

[56] References Cited

U.S. PATENT DOCUMENTS

| | | | |
|---|---|---|---|
| 3,004,298 | 10/1961 | Haynie | 277/153 X |
| 3,010,748 | 11/1961 | Haynie | 277/153 |
| 3,767,739 | 10/1973 | Smith | 277/153 X |
| 3,851,037 | 11/1974 | Day et al. | 277/153 X |

FOREIGN PATENT DOCUMENTS

| | | | |
|---|---|---|---|
| 953029 | 11/1956 | Fed. Rep. of Germany | 277/152 |
| 693317 | 8/1930 | France | 72/379 |
| 46-17653 | 5/1971 | Japan | 29/527.1 |
| 59-144530 | 8/1984 | Japan | 72/379 |
| WO82/03574 | 10/1982 | PCT Int'l Appl. | 72/379 |
| 375434 | 6/1932 | United Kingdom | 72/379 |

Primary Examiner—Robert S. Ward
Attorney, Agent, or Firm—Lawrence J. Shurupoff; Robert F. Hess

[57] ABSTRACT

A circular notch in a rigid annular case element of a shaft seal for preventing distortion of the case during a molding and bending process. The notch is about one-fifth to one-half as deep as the surrounding thickness of the case element and has sloping walls leading to a central flat portion.

7 Claims, 3 Drawing Sheets

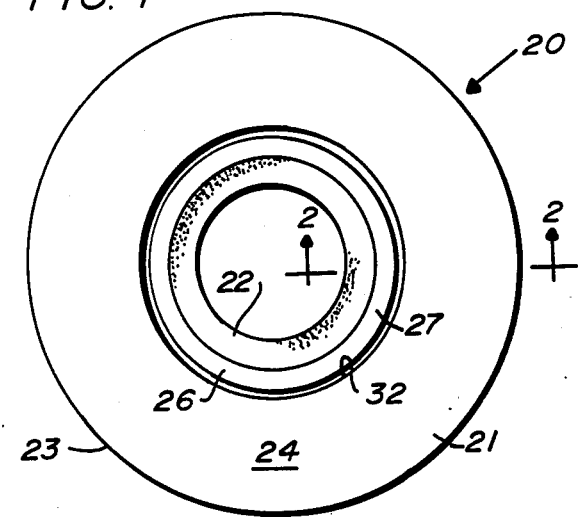
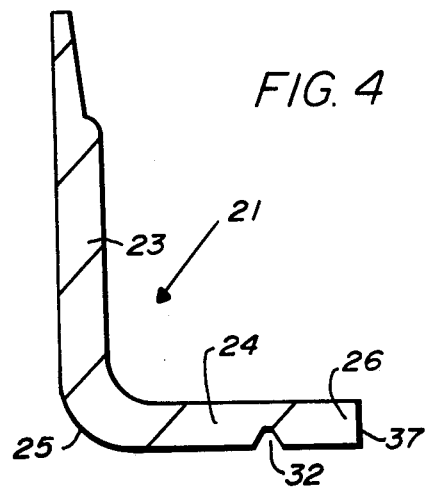
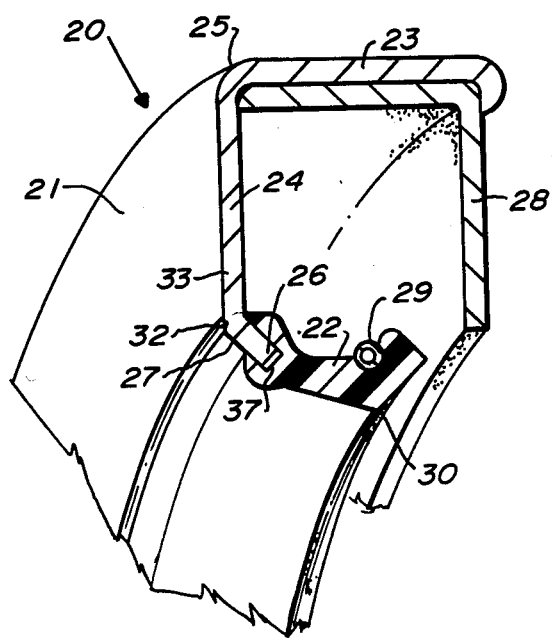
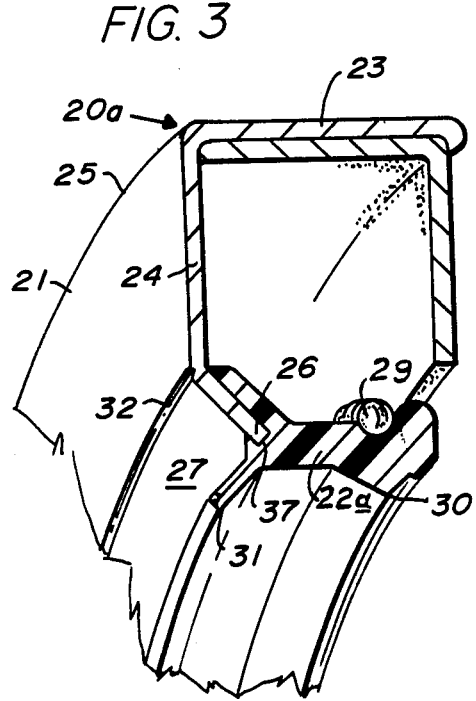
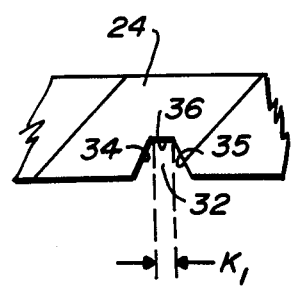

FLUID SEAL WITH NOTCHED FLANGE AND METHOD FOR ITS MANUFACTURE

BACKGROUND OF THE INVENTION

1. Field of the Invention

This invention relates to an improved lubricant seal structure and to an improvement over the method for making seals shown in U.S. Pat. No. 3,004,298; it also relates to an improvement over the product of U.S. Pat. No. 3,010,748.

2. Description of the Prior Developments

U.S. Pat. No. 3,004,298 set forth what was then a radically new method for making fluid seals, a method which resulted in better products than had been available earlier, and which provided more reliable and less expensive molding processes. The present invention preserves all of the benefits of this earlier invention, while giving greatly improved results in certain parts of the method which had over the years created problems.

The metal case in U.S. Pat. No. 3,004,298 is provided with a radial flange which, during manufacture, is placed in a mold that exerts two opposing pressures on the flange. This results in bending or reforming the terminal portion of the radial flange during the molding process to form a seal with a bent inner end surrounded with elastomer. As molded, the inner end of the seal is free from flash.

This prior forming method, especially as applied to a seal where the radial flange extends inwardly from the periphery of the case, exerted a strong inward pulling force upon the metal flange. This force also acted on the cylindrical periphery of the case. The force, sometimes called "heel pull" because it radially pulls in the heel of the metal case, has often been too large to be tolerated, resulting often in a reduction of the outside diameter of the case of up to about 0.01 inch.

The initial metal case stamping operation, which precedes the molding, tends to produce a case with a slightly concave axially extending peripheral portion, the concavity being generally in the order of from 0.001" to 0.015". The outer periphery is permitted tolerances at the heel within a range of from +0.003" to −0.002" so the stated concavity may not seriously affect the press fit of the seal case of the finished seal when it is installed in a machine part. However, a heel pull of 0.010" makes it impossible for the outer periphery to hold the permitted tolerance on the heel, which is where the primary press fit of the finished seal is achieved when it is installed in its intended machine part. Even a heel pull of 0.004" to 0.005" is unsatisfactory and cannot be accepted. A pull that is two or three times as great as that is clearly unacceptable. This heel pull also tends to produce an action called "bulbing" of the radial flange which can create unsatisfactory conditions affecting the quality of the finished part.

The present invention solves the problem of excessive heel pull and provides better tolerances and more uniform parts by reducing the amount of variation in the seal's outer periphery that resulted heretofore from the molding operation.

Thus, one object of the invention is to minimize heel pull and to minimize the reduction in the outer diameter of the metal case which is due to its radial flange being drawn in by the reform or bending phase of the molding process.

Another object of the invention is to reduce the amount of tonnage necessary to achieve the reform—i.e., the bending of the flange—in the mold cavity. One reason for wanting to reduce this tonnage is to make it possible to provide more cavities in the same mold press without having to increase the overall tonnage. Where the required tonnage per part is too large, fewer cavities are possible; where the tonnage per part can be reduced, then more cavities can be used in the mold press with the same overall tonnage. Alternatively, the total tonnage per press can be reduced, if desired.

Another object is to achieve a more consistent and distinct reform or bending operation, improving the mold closure, and also improving the trim qualities of the finished part.

The product and the method of this invention thus relate to a known system of flashless molding and simultaneous bonding of an elastomeric sealing lip to a rigid annular metal case element. In the known method, as best set forth in U.S. Pat. No. 3,004,298, pressure is applied in a first direction against a first face of the case element along a first circular line with a first forming edge of the die adjacent to but spaced from the inner periphery of the case element. Simultaneously, pressure is applied in a second, opposite direction against a second, opposite face of the case element along a second circular line with a second forming edge of the die which is concentric with the first circular line and first forming edge of the die. The second circular edge is radially outwardly spaced from the inner periphery of the case element and radially outwardly spaced from the first circular line or edge of the die. These two opposed pressures bend an annular peripheral margin along the case element at an angle to its radially extending portion.

Meanwhile, elastomeric material is forced against the exposed surfaces of the case element between the first and second lines and corresponding edges of the die and around the inner periphery of the case element, thereby bonding the elastomeric material to the case element, without flash, by the applied axial pressure.

SUMMARY OF THE INVENTION

The improvement of this invention is directed to providing a seal case element, before it is placed in the mold and before the mold pressure is applied to it, with a circular notch corresponding to the location where a circular bend line is to be formed therein. That is, the notch is formed within the case element so that a circular edge of the mold will contact the case element adjacent to and juxtaposed over the notch during the molding operation.

The notch is nominally about one-fifth to one-half as deep as the surrounding thickness of the metal case element adjacent the notch and is preferably formed with sloping side walls leading to a central flat portion. The slope may be formed at about a 45° angle with respect to the faces of the radially extending portion of the case element. As a result, the amount of reduction in the outer periphery (the heel pull) resulting from the inward pull upon the case element due to the application of the two opposed pressures is substantially reduced. Hence, the case elements are better standardized in quantity production.

The invention basically includes scoring or coining a substantially circular notch in the outside face of a sheet metal die-stamped member in its first die operation. The circular score mark or notch preferably extends 360° and is centered on the same centerline as the inner periphery or inner edge of the upper mold cavity that is later used to reform the case's flange and bond the rubber thereto. Accordingly, this inner circular edge of the upper mold cavity has approximately the same diameter as that of the circular score mark, so that the inner edge is positioned and aligned over the score mark during molding.

The score mark results in greatly reducing the amount of material that is pulled in from the outer periphery of the sheet metal member during molding. Instead of being pulled radially inwardly, the metal spreads apart at the score mark. Since the score mark reduces the thickness of the metal at that point, it enables the use of lower forming tonnage per part. By breaking the flow of the metal from the outer periphery of the die-stamped metal member, the material can be better controlled and better standardized.

Other objects and advantages of the invention will appear from the description of the following preferred embodiments.

BRIEF DESCRIPTION OF THE DRAWINGS

FIG. 1 is a view in end elevation of an annular seal embodying the principles of the invention.

FIG. 2 is an enlarged fragmentary view in perspective and section taken along the line 2—2 in FIG. 1.

FIG. 3 is a view similar to FIG. 2 of a dual-lip seal according to the invention.

FIG. 4 is a further enlarged view in elevation and in section of the case prior to its reform or bending, showing the critical notch.

FIG. 5 is a still further enlarged view of a portion of the case of FIG. 4 at and adjacent to the notch.

DETAILED DESCRIPTION OF THE PREFERRED EMBODIMENTS

Figure 6:
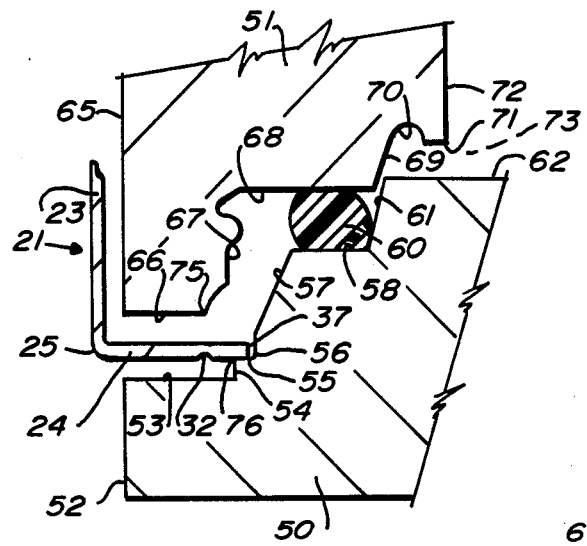
FIG. 6 is a fragmentary view in section of a mold with the case located in the mold, as mold closing begins.

FIG. 1 shows a completed annular seal (20) embodying the principles of the invention. The seal has an outer annular metal case element (21) and an elastomeric element (22) bonded thereto. As shown in FIG. 2, case (21) has an outer peripheral, generally axially extending annular portion (23), and a radially inturned flange (24) having opposed radial faces meeting annular portion (23) at heel (25). The opposed faces of the flange (24) are joined at the inner annular periphery of the case element by an axially extending inner peripheral edge (37). An inner peripheral portion of the flange has a frusto-conical bent-in terminal portion (26) to which the annular elastomeric element (22) is bonded.

After molding, the bent-in portion may form an obtuse angle with respect to the inturned flange, as seen in FIG. 3. The actual angle through which portion (26) is bent may range from 25° to 50° thus forming an obtuse angle ranging from 130° to 155°.

The bonding of the elastomeric element takes place on both faces or sides of the bent-in portion (26), but does not extend the full length of the outer face (27). In the finished seal (20), there is also provided an inner case (28) and a garter spring (29), as shown in FIG. 2. The elastomeric element (22) is formed with at least one lip (30) for sealing between two relatively rotating members such as a housing and a shaft. Annular peripheral portion (23) seals against one of the relatively rotating members and annular peripheral portion (26) with lip (30) seals against the other member.

FIG. 3 shows a double lip seal (20a), basically the same as the seal (20) except for having two lubricant sealing lips (30) and (31). Various lip shapes can be produced, but the main lip (30) is usually trimmed to final shape after molding, although as-molded lips can be made. Frusto-conical lip (31) typically serves as a dust sealing lip which extends diagonally, that is radially and axially, from bent portion (26). In use, lip (31) extends radially between one of the relatively rotating members and axially toward the plane of radial flange (24). Substantially the full axial extent of the lip (31) lies within the axial extent of the bent portion (26).

Web (22a) extends out from bent portion (26) in a generally axial direction away from the plane of radial flange (24) and joins lip (31) to the bent portion (26) which provides close direct support to the dust sealing lip (31). Lip (30) is thereby supported for independent action substantially unaffected by flexure of web (22a) and lip (31), though molded integrally therwith. In use, the lips may engage a shaft, while axial portion (23) may engage a housing member. Lip (31) may be formed with a V-shaped periphery adjacent the bent portion and with an opposed grooved periphery having a garter spring (29) provided in the groove.

A very important feature of the present invention is a notch (32) which is formed around the entire outer face (27) of the bent-in portion (26) as seen in FIGS. 2 and 3. The notch defines a circle where the bending occurs during the molding operation. Thus, the notch is located between the bent-in portion (26) and the radial portion (33) of the radial flange (24).

Figure 10:
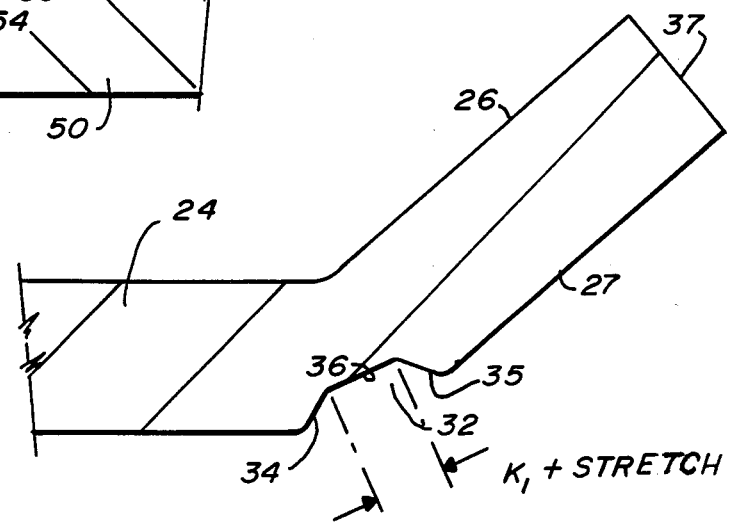
FIG. 10 is an even greater enlarged fragmentary view of the case alone, after the bending or reform operation but with the elastomer omitted.

The enlargements of FIGS. 5 and 10 show the flange (24) before and after reform, respectively. Notch (32) has side walls (34) and (35) extending in preferably at about 45° to a flat radial portion (36). This is preferable to hving the two walls (34) and (35) meet at a vertex, because it prevents tearing and damage to the flange (24) at that point when the bent-in portion (26) of the flange (24) is bent during molding. However, for some adaptations, a V-shaped notch may be used as well as other notches having cross-sections defining arcuate or rectangular profiles. Notch (32) is preferably uniform in cross-section and extends concentrically around 360° of the radial flange (24) as seen in FIG. 1.

The flat radial portion (36) may extend over a dimension $K_1$ of, for example, 0.005 inch to 0.015 inch as shown in FIG. 5. After bending, portion (36) is stretched to a larger dimension shown in FIG. 10 as $K_1$+stretch. Notch (32) thus spreads during forming and reduces the pull of metal toward the center of the seal. This reduction of metal flow is schematically depicted by the arrows in FIGS. 11 and 12. The effect of this seemingly small improvement is much greater than would ordinarily be imagined, and requires some discussion.

Figure 11:
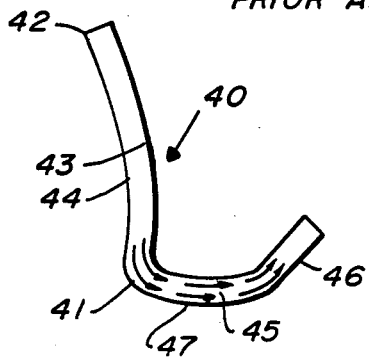
FIG. 11 is a reproduction of a profilometer view of a standard seal case in the prior art after the molding and bending operation, showing the "bulbing" effect ono the outer portion of the radial flange, the radially inward pull on the heel, the concavity of the outer periphery of the case, and the outward flaring at the toe of the case.

In a prior-art seal case (40), as shown in FIG. 11 there is a tendency to pull the heel portion (41) radially inwardly during bending of the radial flange (45). There also tends to be flaring at the free edge or toe (42) of the cylindrical peripheral portion (43) and a concavity (44) between the toe (42) and the heel (41), where the peripheral portion (43) joins the radial flange (45). The flange (45) is initially radial, but when its tip (46) is bent in during the molding operation, the heel portion (41) is pulled in radially, as has been mentioned above. This inward pull results in a slight bulbing or rounding (47) of the flange (45) between the peripheral portion (43) and the bending area at the flange tip (46). This, as has been said, has caused trouble in controlling and retaining dimensions, and also results in the illustrated distortion of shape shown in FIG. 11, which itself has caused trouble in some installations.

The actual operation of forming the seal (20) is important to the understanding of the case element forming problem and also to the appreciation of the significance of this improvement. The seal, as shown in FIG. 6 (which corresponds to FIG. 10 of U.S. Pat. No. 3,004,298) is made in a mold having a lower mold element (50) and an upper mold element (51). The lower element (50) has an outer cylindrical portion (52) from which a radially inturned seat portion (53) leads to a step (54), having a small circular radial support shelf (55) therebeyond on which the inner end of the case member (21) rests before the mold is closed. The outer edge (76) of the shelf (55) defines a first circular line against the inner end (26) of the case element (21) as positioned for molding. Prior to bending, support shelf (55) may provide the only support needed to position the case element for molding. The case's inner periphery (37) is spaced away from a generally cylindrical mold surface (56). Annular support shelf (55) is preferably formed with a slightly lesser diameter than that of the radial flange (55).

In FIG. 6 the mold is shown partially closed and a frustoconical portion (57), which shapes the elastomer to form a corresponding frustoconical portion thereof, extends inwardly up to another radial portion (58) on which a ring (60) of the uncured elastomer initially rests. This is usually a ring (60) made to shape, but uncured. The elastomer is cured after molding in the mold. Ring (60) is shown partially compressed adjacent to another frustoconical portion (61) of the lower mold (50), which leads up to another radial portion (62) at the uppermost end of the lower mold element (50).

The upper mold element (51) has a cylindrical outer portion (65) from which leads a short radial portion (66), shorter than the radial seat portion (53) of the lower mold element (50). The inner end of the radial portion (66) joins a portion (67) upon which the outer part of the elastomer will be shaped, and that leads to a radial portion (68) which faces the radial portion (58). The inner end of the radial portion (68) meets a frustoconical portion (69) which leads to a flash receiving cavity (70), where such flash as is produced is generally trapped (see FIGS. 7 and 8).

If the volume of flash exceeds the volume of the cavity (70), more flash can flow beyond the cavity (70) between the radial portion (62) of the lower mold member (50) and a radial portion (71) of the upper mold element (51). The upper mold element (51) ends in an inner cylindrical portion (72). A central cylindrical recess (73) is provided to receive flash in case the mold has been overloaded with elastomer, which is generally not the case. Flash is therefore confined to the area around the cavity (70) and beyond and does not occur down at or near the bent inturned end (26) of the flange (24), where the elastomer is to be attached to the flange.

Figure 7:
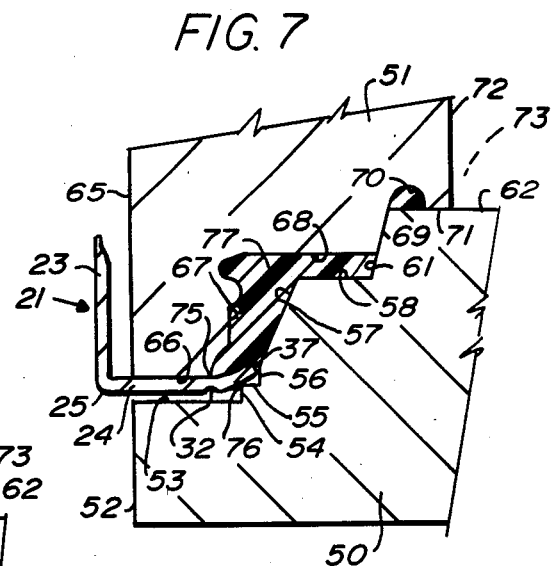
FIG. 7 is a view similar to FIG. 6 during a later stage of the molding process, with bending of the inner end of the case's radial flange beginning.

During closure of the mold, one of the mold elements (50) or (51) moves toward the other, so that they exert opposite pressures. Since the radially inner end (26) of the flange (24) rests on the short annular shelf (55) and the radially outer portion of the flange is unsupported as shown in FIG. 6, movement of the mold surface (66) toward the mold seat surface (53) results in reforming of the flange. A circular inner edge (75) of the radial mold surface (66) defines a circular line which lies concentrically and radially outside circular outer edge (76) of the shelf 55. Edge (76) also defines a circular line against the flange so that when the surface (66) engages the flange (24) and pushes the engaged portion of the flange (24) toward the mold surface (53), the flange (24) is bent along a circle which, in the present invention lies at about the center of the notch (32), as shown in FIGS. 7 and 10. Bending continues until the flange (24) bottoms on the mold seat surface (53).

Figure 8:
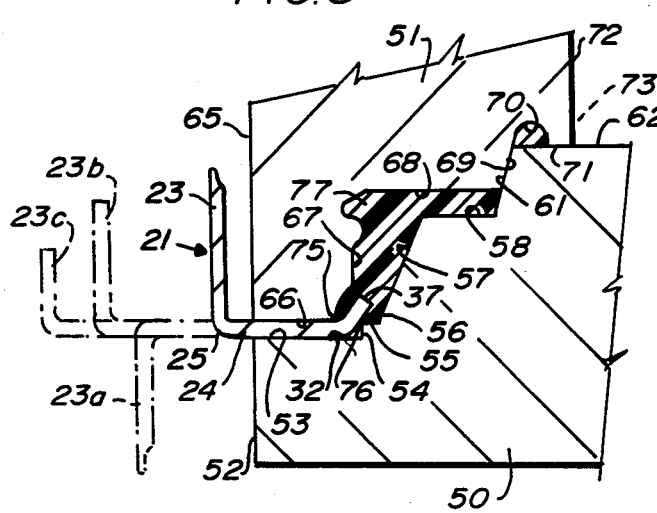
FIG. 8 is a similar view showing the case in the mold after closing of the mold and during and after curing of the elastomer. The view also shows several alternative forms of case structure outside the mold.

In the meantime, the elastomeric member (60) is shaped into a body (77) and bonded to the case (21) at the portions shown in FIG. 8 such that the elastomeric material extends between the circular edges (75) and (76) and around peripheral edge (37). The mold, which is heated, remains closed for a time sufficient to cure the elastomeric body (77). The reforming of the case (21) is what prevents the exit of flash, and generally enables accurate dimensioning.

FIG. 8 indicates that the case can have various outer diameters, directions, and shapes as indicated by outer peripheral portions (23), (23a), (23b), and (23c), for example. After completion of the cure, the mold is opened and the elastomeric body (77) is trimmed to provide the lip (30) as shown in FIGS. 1 and 2.

The large pressures involved during molding tend to pull in metal material from the outer periphery (43) of the case and tend to cause a reduction in at least a portion of the outer diameter of the case. This pull causes bulbing of the portion (47) of the radial flange that lies between the outer periphery and the bend, all as shown in FIG. 11. However, the formation of notch (32) greatly reduces the bending resistance of the metal at the notch, which is where the bending takes place. This also results in the isolation or separation of the bent portion (26) from the outer portion of the flange (24).

As a result, little metal flows across the notch (32). Also, the amount of energy required to accomplish the bend is greatly reduced, since the metal being bent has a reduced thickness compared to what there would be without the notch. Thus, the diameters and all the critical dimensions can be held within much smaller tolerances than heretofore, when greater forces were required and when the metal necessarily tended to pull in from the outer periphery.

Figure 9:
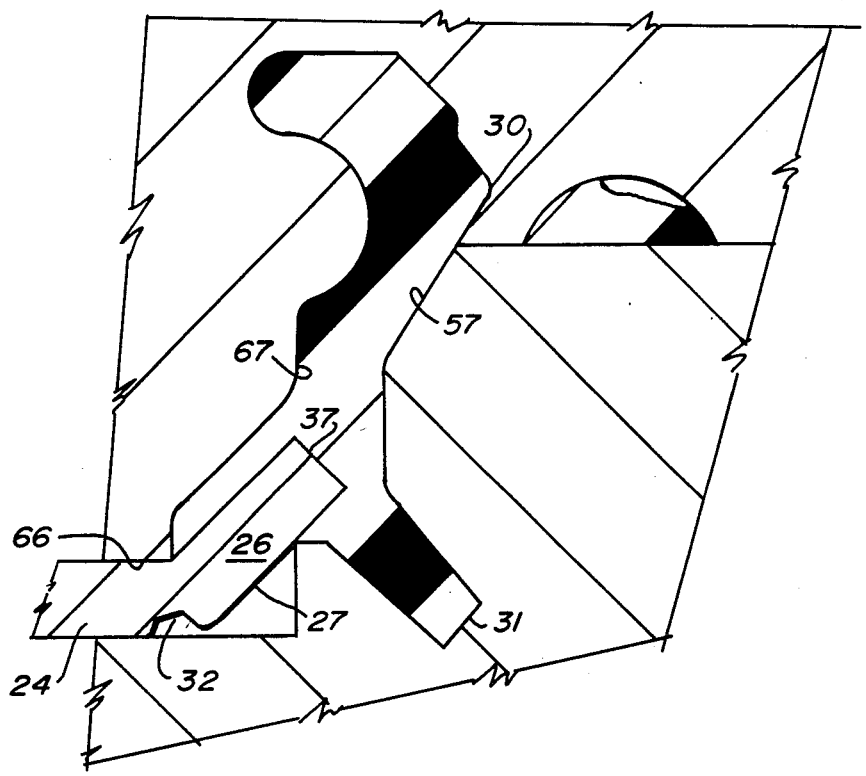
FIG. 9 is a greatly enlarged fragmentary view of a portion of a mold for making dual lip seals, showing the two elastomeric lips and a portion of the case, as applied to an as-molded seal requiring no later trimming.

FIG. 9 shows a portion of a mold used when making the dual-lip seal (20a) (also see FIG. 3) with two as-molded lips (30) and (31) requiring no trimming. Except for the notch (32) the practice is old and requires no detailed description.

Figure 12:
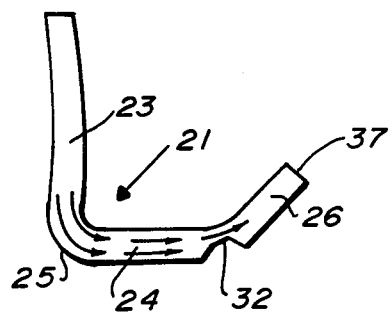
FIG. 12 is a view similar to FIG. 11 of the seal case of this invention, illustrating somewhat the improved results over the prior art seal case of FIG. 11.

FIG. 12 shows that the bending of bent portion (26) at the notch (32) results in very little, if any, bulbing of the flange (24), especially as compared with the bulbing (47) in FIG. 11. Moreover, the heel (25) and the cylindrical outer portion (23) of the case (21) retain their position with very little movement, as can be seen by a comparison with FIG. 11. These two views are derived directly from actual profilometer photographs, though somewhat reduced in size. Thus, the notch (32) and its specific location—the only differences in structure between the two cases—yields very significant results.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A die stamped oil seal comprising a case with a radial flange having an inner radial face and an outer radial face and having an annular bent portion bent along a bend line adjacent its free end to which an elastomer is bonded, the improvement comprising an annular notch provided in said outer radial face along said bend line for reducing distortion of said case during bending of said angular bent portion, said notch, prior to bending, having a flat surface portion extending radially from 0.005 to 0.015 inch to prevent tearing of said flange.

2. A die stamped device for sealing between two relatively rotating members, including in combination: an annular rigid case member having a radial portion and first and second annular peripheries, said first periphery sealing against one of said relatively rotating members, said second periphery being at the opposite end of said radial portion from said first periphery and on a bent portion of said annular rigid case member, said bent portion having an inner radial face and an outer radial face connected by an edge portion and bent through an acute angle meeting said radial portion along a circle spaced from said second periphery, said annular rigid case member having an annular notch formed therein substantially coinciding with said circle and located where said radial portion meets said bent portion along said outer radial face, and a molded annular elastomeric sealing member bonded during stamping and molding to said annular rigid case member by a thin portion on said edge portion and by portions on said inner and outer radial faces of said bent portion.

3. The device of claim 2 wherein said elastomeric sealing member further comprises two sealing lips, one said lip being a dust-sealing lip extending directly from said bent portion in a diagonal that extends radially between said bent portion and the other relatively rotating member and axially toward the plane of said radial portion with substantially its full axial extent lying within the axial extent of said bent portion, the other said lip being a lubricant sealing lip.

4. A die stamped device for sealing between a shaft housing and a relatively rotating shaft, including in combination: an annular rigid case member having an axially extending outer cylindrical peripheral flange for sealing against said housing and a radially-inwardly extending radial flange having at its inner periphery a frusto-conical bent portion meeting a truly radial portion of said radial flange along a circle and at an angle of between 25° and 50°, said radial flange having an inner radial face, an outer radial face and a peripheral edge, said annular rigid case member having an annular notch substantially coinciding with said circle and located in said outer radial face where said truly radial portion meets said bent portion, and a molded annular elastomeric member for engagement with said shaft, said elastomeric member being bonded to said radial flange during molding at an area confined to a surface portion of said bent portion.

5. The device of claim 4 wherein said elastomeric member comprises a first lip portion and a flexing web to which a second lip portion is secured, said web extending axially from said bent portion and away from said radial flange, said first lip inclined to said bent portion and extending toward the plane of said radial flange, said first lip being an integral part of said elastomeric member and substantially independent of any flexure of said web and of any movement of said second lip secured to said web, and wherein said device further comprises an annular spring mounted on said second lip for urging it into contact with said shaft, said first lip thereby being independent of pressure of said spring.

6. In a fluid seal of the shaft type, the combination of: a die stamped annular metal case member with a cylindrical rim and a generally radial flange, said flange having an annular portion formed during stamping into a bent frusto-conical end portion extending at an angle of 25° to 50° to a radial plane and extending in the same axial direction from said radial flange as said cylindrical rim and meeting a radial portion of said flange along a circular intersection;

said case member having formed in an outer surface portion from which said frustoconical portion extends away at said intersection a circular notch extending inwardly for about 1/5 to ½ of the thickness of said radial flange, said notch, prior to bending, having a flat surface portion extending radially from 0.005 to 0.015 inch to prevent tearing of said flange, and an integral annular oil-resistant elastomeric sealing member having a bonding portion bonding to said case on the surface of said bent end portion.

7. The seal of claim 6 wherein said elastomeric sealing member comprises a first lip secured directly to said bonding portion and lying entirely on one axial side of said bent end portion and extending therefrom toward the plane of said radial flange and stopping short of said plane so that said radial flange protects said first lip, a web secured directly to said bonding portion on the other axial side of said end portion and extending axially therefrom away from said radial flange, a second lip having a V-shaped portion and a grooved portion and secured to said web at the opposite axial extremity thereof from said end portion, and a garter spring provided in said grooved portion of said second lip such that said first lip acts independently of the pressure of said spring on said second lip.

* * * * *